Oct. 31, 1967
J. C. CAIRNS ET AL
3,349,427
HINGE
Filed Aug. 27, 1965
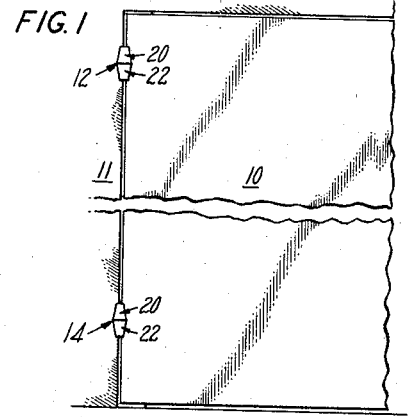
FIG. 1
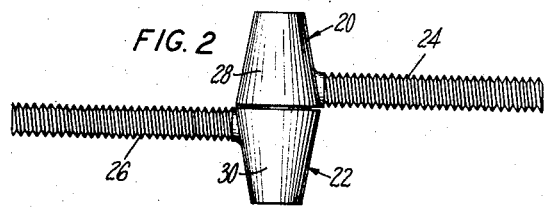
FIG. 2
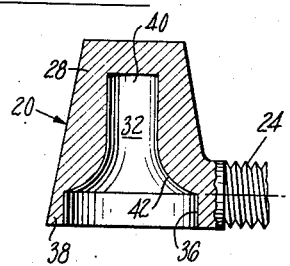
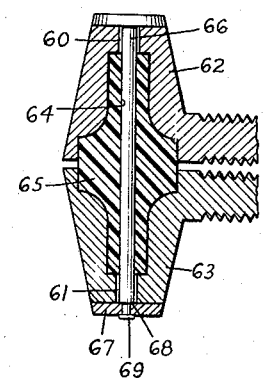
FIG. 4
FIG. 3
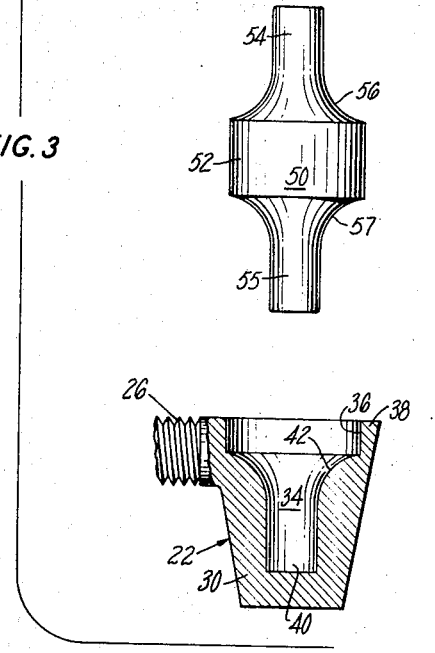
INVENTORS
JOHN C. CAIRNS
CHARLES R. SUSKA
BY
ATTORNEYS

United States Patent Office 3,349,427
Patented Oct. 31, 1967

3,349,427
HINGE
John C. Cairns, New Britain, and Charles R. Suska, Roxbury, Conn., assignors to The Stanley Works, New Britain, Conn., a corporation of Connecticut
Filed Aug. 27, 1965, Ser. No. 483,226
7 Claims. (Cl. 16—128)

ABSTRACT OF THE DISCLOSURE

This invention relates to hinges including two hinge elements each having a threaded shank portion and a knuckle portion connected by means of a pintle formed of low-friction plastic such as nylon or Delrin, the pintle having an enlarged cylindrical mid portion, smaller cylindrical end portions joined by concave surfaces of revolution to the mid portion, the pintle being received in correspondingly shaped recesses in the knuckle portions and supporting the knuckle portions in slightly spaced-apart relation, thereby to provide relatively frictionless operation and to afford great resistance to lateral or shear forces exerted on the hinge elements.

---

This invention relates to improvements in hinges for doors and the like and, more particularly, to hinges of compact shape and size which are capable of supporting heavy axial and radial loads.

Prior hinges usually include eyes or knuckles which have blind or through bores of substantially uniform diameter for receiving a hinge pin or pintle to enable the hinge leaves to pivot and carry the loads to which they are subjected. To keep the hinge knuckles within reasonable size limitations, commensurate with the stresses to which they are subjected, the bores therein and the pintles must be of relatively small diameter. Inasmuch as the pintles are subjected to substantial shearing stresses they have been formed, heretofore, of metal, such as, for example, steel. The metal-to-metal contact of the knuckles and the hinge pins result in relatively rapid wear and noisy operation unless the hinges are lubricated frequently and even then because the hinges are usually exposed, dirt and grit tend to accumulate on the oiled or lubricated surfaces and produce wear and noise.

Prior hinges also have other disadvantages. For example, many leaf-type hinges cannot be installed in an inverted position and, moreover, have to be manufactured in left-hand or right-hand models for installation on opposite sides of a door frame or the like. Such hinges present difficulties for the home craftsman as well as for manufacturers of prehung doors and other structural and furniture products.

The prior leaf-type hinges also are heavy and overly bulky so that the shipping, handling and storage expenses for such hinges are undesirably high.

In accordance with the present invention, hinges are provided which take advantage of the self-lubricating or low-friction properties of plastics, such as nylon, Delrin and the like, and which at the same time have high resistance to thrust and radial shear loads.

More particularly, hinges according to the present invention include upper and lower hinge members, each having a knuckle of generally cup-like form provided with an internal recess of substantial diameter adapted to receive a low-friction hinge pintle not requiring lubrication and of such cross-sectional dimensions as to fit within the recesses in the hinge knuckles and provide a sufficient cross-section or mass to resist the maximum shear loads to which the hinges might reasonably be subjected. Moreover, the hinge pintle is dimensioned with respect to the recesses in the hinge knuckles so that the confronting faces of the hinge knuckles are maintained in spaced-apart relation and the thrust loads applied to the knuckles are transmitted to the pintle without allowing the hinge knuckles to come in contact with each other. Accordingly, the new hinges, due to their contact with and support by the low-friction pintle move easily and silently, do not require lubrication and at the same time are strong and capable of withstanding high thrust and shear stresses. Moreover, the hinges can be made smaller and of lighter weight than prior hinges of equal load carrying capacity and because of the structure of the pintle and the cooperating knuckles, the new hinges can be made in many shapes and forms and provided with ornamental finishes not heretofore possible with conventional leaf-type hinges.

A feature of the new hinges is the provision of threaded shanks extending from the knuckles for attaching the knuckles to a door and door frame or other support. These shanks may be provided with screw threads suitable for screwing into wood or with machine screw threads for engagement in threaded apertures, for example, in metal doors and door frames. Provision of such threaded shanks instead of the conventional leaves reduces the weight and size of the new hinges and transportation, handling and storage costs and space. Moreover, the threaded shanks permit more ready installation of the hinges and adjustment and alignment thereof and completely overcome the need for left-hand and right-hand models of the hinges. Moreover, the hinges are reversible so that improper installation is almost impossible, a great advantage to the home craftsman and particularly to manufacturers of products having hingedly connected parts, such as prehung doors and frames.

For a better understanding of the present invention, reference may be had to the accompanying drawings, in which:

FIGURE 1 is a fragmentary front elevational view of a door installation including a pair of hinges made according to this invention;

FIGURE 2 is an enlarged front elevational view of a hinge constructed in accordance with this invention;

FIGURE 3 is a further enlarged exploded view partly in cross-section and partly broken away of the hinge of FIGURE 1; and FIGURE 4 is a cross-sectional view of a modified form of hinge embodying the invention.

Referring now to the drawings, FIGURE 1 illustrates a door 10 mounted in a door frame 11 by a pair of hinges 12 and 14 constructed according to this invention.

As shown, each of the hinges 12 and 14 comprises a pair of substantially identical hinge members 20 and 22 which have threaded cylindrical shank portions 24 and 26, respectively, for securing the hinge members to the door or door frame, as described more particularly in the Charles R. Suska application Ser. No. 483,227, filed Aug. 27, 1965.

The shanks 24 and 26 are received in threaded inserts or sockets in the door and door frame and can be screwed into or out of the inserts or sockets to adjust the door relative to the door frame and to align pairs of hinges supporting the door. The shanks 24 and 26 can be provided with threads suitable for insertion directly in wood doors and door frames if desired, and appropriately threaded shanks for hanging wood doors in metal frames, or metal doors in wood frames, can be provided.

Knuckle portions 28 and 30, respectively, which, as best shown in FIGURE 3, are provided with pintle-receiving recesses 32, 34, respectively, in one end thereof are fixed to the outer ends of the shanks 24 and 26. The recesses 32, 34 include an enlarged cylindrical entry portion 36 defined by annular lip 38, an elongated cylindrical bottom portion 40 shown as having a closed end, and a fillet or concave intermediate portion 42. As shown in FIGURE 3, the cylindrical entry portion 36 has a diameter about three-quarters to seven-eighths of the outer diameter of the open end of the knuckle portion, is slightly more than twice the diameter of the cylindrical bottom portion 40 and the depth of the recesses 32, 34 is slightly greater than twice the radius of the cylindrical entry portion 36 thereof.

The pintle member 50, which is preferably, although not necessarily, formed entirely of a molded low friction resilient material such as nylon or Delrin, is provided with an enlarged intermediate bearing portion 52 and elongated cylindrical end portions 54, 55 which are received within the recesses of the hinge members. For hinges adapted to support heavy doors the bearing portion 52 may be formed of plastic such as nylon or Delrin and the end portions 54 and 55 may be the ends of a metal shaft extending through the bearing portion 54. Between the enlarged bearing portion 52 and the end portions 54, 55 are thrust bearing surfaces 56 and 57 for the hinge. As shown, the surfaces 56 and 57 are concavely curved fillets at opposite ends of and composed of the same material as the bearing portion 52, but they may be conical or convexly curved, if desired. Preferably, the fillets 56, 57 merge into the cylindrical end portions 54, 55, respectively, with on surface discontinuity therebetween and forming compound curved surfaces therewith. The dimensions of the pintle are such that it has a close running fit with the cylindrical entry portion 36, the intermediate fillet portion 42, and the cylindrical bottom portion 40 of each of the hinge members.

The circle of discontinuity at which the cylindrical entry portion 36 of the recess terminates and the curved intermediate or fillet portion 42 begins is shown in FIGURE 3 as being located in the plane of the axis of the cylindrical shank portion of each hinge member. With this construction, the radial forces transmitted between the hinge members due to load imposed on the hinge by the door produce little turning moment tending to rotate the cylindrical shank portions 24 and 26 relative to tht door or door frame in which they are mounted. Some variation in the location of the shanks lengthwise of the knuckle portions is possible, but best results are obtained if the shanks are located not more than one-half the distance between the open end of the recess 32 or 34 and the middle of the knuckle.

As shown in FIGURE 2, the enlarged cylindrical portion 52 of the pintle is slightly greater in axial length than the combined depths of the cylindrical entry portion 36 so that the hinge members are slightly spaced apart and the entire thrust load on the hinge is carried by the pintle 50. Also, the pintle 50 is subjected to shear loading resulting from the radial forces between the hinges. Inasmuch as the annular lip portion 38 of the knuckle portions of the hinge surround the enlarged cylindrical portion 52, the entire cross-section of the pintle resists the shear loading. The end portions 54 and 55 aid in aligning the hinge members and preventing relative rotation of the hinge members around the axes of their shanks 24 and 26. Prolonged endurance tests show that the hinges can operate quietly and smoothly for many years without lubrication or other servicing.

Because hinges constructed according to this invention may have knuckle portions of comparatively small size, the knuckle portions may be capped, if desired, to provide an elongated barrel to achieve the conventional appearance. To this end, the external periphery of the knuckle portions of the hinges may be in the form of truncated cones to facilitate the mounting of a decorative cap in any suitable manner as, for example, disclosed and claimed in John S. Parsons U.S. Patent No. 3,154,803, dated Nov. 3, 1964.

It will be readily apparent that with one of the hinge members mounted on a door and the other mounted on a door frame and the pintle members seated in the recess of one of the hinge members, the door may be mounted by inserting the other hinge member over the free end of the pintle and, in this connection, the enlarged entry portion of the recess, coupled with the thrust surfaces, serves to center the pintle relative to the other hinge member and facilitates the blind installation of the hinge. Inasmuch as the hinge members are essentially the same and the pintle is enclosed within the knuckles, the hinges can be reversed end for end and they can be used at the right-hand or left-hand edge of a door or the like.

The hinge of this invention combines a large concealed thrust bearing surface in a hinge having high capacity for carrying radial loads despite the small size of the hinge.

If, for security or any other purpose, it is desired to connect the hinge members to prevent their disengagement after installation, they can be modified as shown in FIGURE 4. Holes 60 and 61 are drilled in the knuckles 62 and 63 and a corresponding but smaller diameter hole 64 is formed in the pintle 65. A headed pin 66 is inserted through the holes 60, 61 and 64 with clearance in the holes 60, 61 and a tight fit in the hole 64. A washer 67 is fitted over the lower end of the pin against shoulder 68 thereon to prevent binding of the hinge knuckles and the end 69 of the pin is swaged or peened to lock the pin in the knuckles. The clearance between the pin and the holes in the knuckles permits rocking movement between the hinge knuckles if they are somewhat misaligned.

As will be apparent to persons skilled in the art, various modifications and adaptations of the structure above described will become readily apparent without departure from the spirit and scope of the invention, the scope of which is defined in the appended claims.

We claim:
1. A hinge comprising a pair of identical hinge members each having a threaded cylindrical shank portion and a knuckle portion, and a molded pintle for securing the hinge members together for relative pivotal movement, the knuckle portions of each of said hinge members having a circular recess in one end thereof comprising an enlarged cylindrical entry portion, a convexly curved annular intermediate portion and a cylindrical bottom portion, and said pintle being formed of a low friction plastic and having an integral enlarged centrally disposed thrust bearing portion of greater axial length than the combined depths of said entry portions of said recesses and having a cylindrical outer surface seated wtihin said annular recesses and disposed between a pair of concave thrust bearing surfaces respectively engaging the convexly curved intermediate portions of said recesses, the circle of discontinuity between the cylindrical outer surface of the thrust bearing portion and the concave intermediate portions thereof being positioned substantially in alignment with the axis of the shank portions of the hinge members.

2. A hinge comprising a pair of substantially identical hinge members each having a cylindrical shank portion and a knuckle portion and a pintle for securing the hinge members together for relative pivotal movement, the knuckle portions of said hinge members each having a circular recess in one end thereof, said recess comprising an enlarged cylindrical entry portion, an elongated cylindrical bottom portion of smaller diameter than the entry portion, and an intermediate convexly curved annular portion joining the two cylindrical portions, said pintle being complementary shaped and dimensioned to provide a close running fit with the walls of the two cylindrical portions and the convexly curved intermediate portion of the recess and to retain said hinge members in axial spaced relation.

3. A hinge as recited in claim 2 wherein the diameter of the enlarged entry portion of the recesses is more than twice the diameter of the elongated bottom portion of the recess to provide an enlarged thrust bearing surface between the pintle and the hinge members.

4. A hinge as recited in claim 3 wherein the pintle is formed of a molded, resilient low-friction plastic.

5. A hinge as recited in claim 2 wherein the depth of each of the recesses is at least twice the radius of the cylindrical entry portion of the recesses.

6. A hinge as recited in claim 2 wherein the circle of discontinuity between the enlarged entry portion of the recess and the intermediate convexly curved portion thereof is positioned at least as great a distance from the end of the recess as is the centerline of the shank portion of the hinge.

7. The hinge set forth in claim 2 comprising a pin extending axially through said knuckle portions and said pintle and means securing said pin against removal from said knuckle portions.

References Cited

UNITED STATES PATENTS

| | | | |
|---|---|---|---|
| 2,134,993 | 11/1938 | Wimmenauer | 16—136 |
| 2,828,668 | 4/1958 | De Angelis | 16—168 |
| 3,278,981 | 10/1966 | Glenn et al. | 16—128 |

FOREIGN PATENTS 1,228,901  3/1960  France.

MARVIN A. CHAMPION, *Primary Examiner.*

DORIS L. TROUTMAN, *Assistant Examiner.*